US009087335B2

(12) United States Patent
Rane et al.

(10) Patent No.: US 9,087,335 B2
(45) Date of Patent: Jul. 21, 2015

(54) MULTIDIMENSIONAL PERSONAL BEHAVIORAL TOMOGRAPHY (75) Inventors: Rajendra Rane, Woodbridge, NJ (US); David Juang, Forest Hills, NY (US); Eduardo J. Alvarez, West Windsor, NJ (US); Iwao Fusillo, Merrick, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 2238 days.

(21) Appl. No.: 11/529,730

(22) Filed: Sep. 29, 2006

(65) Prior Publication Data

US 2008/0091508 A1   Apr. 17, 2008

(51) Int. Cl.
G06Q 30/00      (2012.01)
G06Q 30/02      (2012.01)

(52) U.S. Cl.
CPC ............ *G06Q 30/02* (2013.01); *G06Q 30/0204* (2013.01)

(58) Field of Classification Search
USPC ........ 705/7.11–7.42, 14.1–14.4, 15, 16, 26.1, 705/30, 35, 319; 706/1–15, 45; 709/201–238; 725/1–37
See application file for complete search history.

(56) References Cited

U.S. PATENT DOCUMENTS

| | | | | |
|---|---|---|---|---|
| 4,908,761 A * | 3/1990 | Tai | ............................... | 705/14.26 |
| 5,041,972 A * | 8/1991 | Frost | ............................. | 705/7.32 |
| 5,201,010 A * | 4/1993 | Deaton et al. | ................. | 382/139 |
| 5,224,034 A * | 6/1993 | Katz et al. | .................... | 705/7.36 |
| 5,592,560 A * | 1/1997 | Deaton et al. | ................. | 382/100 |
| 5,642,485 A * | 6/1997 | Deaton et al. | ............... | 705/14.25 |
| 5,649,114 A * | 7/1997 | Deaton et al. | ............... | 705/14.35 |
| 5,864,857 A * | 1/1999 | Ohata et al. | ............................ | 1/1 |
| 5,870,746 A * | 2/1999 | Knutson et al. | ........................ | 1/1 |
| 5,930,764 A * | 7/1999 | Melchione et al. | ........... | 705/7.29 |
| 5,974,396 A * | 10/1999 | Anderson et al. | ............ | 705/7.33 |
| 6,009,407 A * | 12/1999 | Garg | ............................ | 705/7.25 |
| 6,014,647 A * | 1/2000 | Nizzari et al. | ................... | 705/39 |
| 6,026,397 A * | 2/2000 | Sheppard | ............................... | 1/1 |
| 6,032,146 A * | 2/2000 | Chadha et al. | ................. | 707/737 |
| 6,122,628 A * | 9/2000 | Castelli et al. | ......................... | 1/1 |
| 6,134,541 A * | 10/2000 | Castelli et al. | ......................... | 1/1 |
| 6,134,555 A * | 10/2000 | Chadha et al. | ................. | 707/737 |
| 6,182,060 B1 * | 1/2001 | Hedgcock et al. | ..................... | 1/1 |
| 6,216,129 B1 * | 4/2001 | Eldering | ..................... | 705/36 R |
| 6,260,038 B1 * | 7/2001 | Martin et al. | .......................... | 1/1 |
| 6,289,354 B1 * | 9/2001 | Aggarwal et al. | ....................... | 1/1 |
| 6,349,309 B1 * | 2/2002 | Aggarwal et al. | ...................... | 1/1 |
| 6,430,539 B1 * | 8/2002 | Lazarus et al. | ............... | 705/7.31 |

(Continued)

*Primary Examiner* — Alan S Miller
(74) *Attorney, Agent, or Firm* — Snell & Wilmer L.L.P.

(57) ABSTRACT

A method and computer program product for identifying attributes of customers and potential customers, allowing marketing to be directed at such consumers. Information is received regarding each of a number of consumers. This information can include demographic information, data regarding spending habits, and information as to how such attributes may have changed over time. Once attributes have been determined, and any changes over time to such attributes have been determined, a correlation of the attributes is performed. Such combined attributes are denoted as composite dimensions. Given the composite dimensions, as well as attributes that may not have been correlated with any other attributes, consumers are plotted in the resulting multi-dimensional space. Sets of consumers that appear to be grouped in this multi-dimensional space are then identified. Common attributes of this consumer group are identified. Unique attributes of a given consumer in such a group are also identified.

15 Claims, 9 Drawing Sheets

(56) References Cited

U.S. PATENT DOCUMENTS

| | | | | |
|---|---|---|---|---|
| 6,493,723 B1* | 12/2002 | Busche | | 707/776 |
| 6,519,572 B1* | 2/2003 | Riordan et al. | | 705/16 |
| 6,629,097 B1* | 9/2003 | Keith | | 1/1 |
| 6,742,003 B2* | 5/2004 | Heckerman et al. | | 398/189 |
| 6,839,682 B1* | 1/2005 | Blume et al. | | 705/7.31 |
| 6,925,441 B1* | 8/2005 | Jones et al. | | 705/7.33 |
| 6,952,700 B2* | 10/2005 | Modha et al. | | 707/777 |
| 7,007,020 B1* | 2/2006 | Chen et al. | | 705/7.29 |
| 7,010,495 B1* | 3/2006 | Samra et al. | | 705/14.41 |
| 7,080,081 B2* | 7/2006 | Agarwal et al. | | 707/600 |
| 7,117,208 B2* | 10/2006 | Tamayo et al. | | 707/777 |
| 7,165,037 B2* | 1/2007 | Lazarus et al. | | 705/7.31 |
| 7,219,099 B2* | 5/2007 | Kuntala et al. | | 1/1 |
| 7,284,204 B2* | 10/2007 | Lee | | 715/764 |
| 7,328,169 B2* | 2/2008 | Temares et al. | | 705/7.33 |
| 7,398,270 B1* | 7/2008 | Choi et al. | | 1/1 |
| 7,424,439 B1* | 9/2008 | Fayyad et al. | | 705/7.33 |
| 7,490,052 B2* | 2/2009 | Kilger et al. | | 705/7.31 |
| 7,533,038 B2* | 5/2009 | Blume et al. | | 705/7.31 |
| 7,631,005 B2* | 12/2009 | Thomsen | | 1/1 |
| 7,698,163 B2* | 4/2010 | Reed et al. | | 705/10 |
| 7,747,339 B2* | 6/2010 | Jacobus et al. | | 700/99 |
| 7,774,227 B2* | 8/2010 | Srivastava | | 705/7.34 |
| 7,853,472 B2* | 12/2010 | Al-Abdulqader et al. | | 705/7.13 |
| 7,933,792 B2* | 4/2011 | Barnard et al. | | 705/7.11 |
| 8,494,935 B2* | 7/2013 | Sandholm et al. | | 705/35 |
| 8,533,063 B2* | 9/2013 | Erickson | | 705/26.4 |
| 8,543,473 B2* | 9/2013 | An et al. | | 705/28 |
| 8,595,058 B2* | 11/2013 | Fordyce et al. | | 705/14.1 |
| 8,843,391 B2* | 9/2014 | Fordyce et al. | | 705/14.1 |
| 2002/0042751 A1* | 4/2002 | Sarno | | 705/26 |
| 2002/0082966 A1* | 6/2002 | O'Brien et al. | | 705/36 |
| 2002/0087705 A1* | 7/2002 | Smyth | | 709/229 |
| 2002/0099598 A1* | 7/2002 | Eicher et al. | | 705/11 |
| 2002/0107858 A1* | 8/2002 | Lundahl et al. | | 707/100 |
| 2002/0128906 A1* | 9/2002 | Belth | | 705/14 |
| 2002/0143677 A1* | 10/2002 | Prakash | | 705/35 |
| 2002/0178077 A1* | 11/2002 | Katz et al. | | 705/26 |
| 2002/0184075 A1* | 12/2002 | Hertz et al. | | 705/10 |
| 2002/0188507 A1* | 12/2002 | Busche | | 705/14 |
| 2003/0033179 A1* | 2/2003 | Katz et al. | | 705/7 |
| 2003/0061132 A1* | 3/2003 | Yu et al. | | 705/30 |
| 2003/0105658 A1* | 6/2003 | Chen et al. | | 705/10 |
| 2003/0110074 A1* | 6/2003 | Vives | | 705/10 |
| 2003/0172008 A1* | 9/2003 | Hage et al. | | 705/28 |
| 2003/0184588 A1* | 10/2003 | Lee | | 345/772 |
| 2003/0220773 A1* | 11/2003 | Haas et al. | | 703/2 |
| 2004/0117242 A1* | 6/2004 | Conrad et al. | | 705/11 |
| 2004/0138958 A1* | 7/2004 | Watarai et al. | | 705/26 |
| 2004/0167789 A1* | 8/2004 | Roberts et al. | | 705/1 |
| 2004/0215626 A1* | 10/2004 | Colossi et al. | | 707/100 |
| 2005/0033630 A1* | 2/2005 | Kowalchuk | | 705/10 |
| 2005/0102292 A1* | 5/2005 | Tamayo et al. | | 707/10 |
| 2005/0114382 A1* | 5/2005 | Lakshminarayan et al. | | 707/102 |
| 2005/0159996 A1* | 7/2005 | Lazarus et al. | | 705/10 |
| 2005/0177449 A1* | 8/2005 | Temares et al. | | 705/26 |
| 2005/0209909 A1* | 9/2005 | Dull et al. | | 705/10 |
| 2005/0240468 A1* | 10/2005 | Inman et al. | | 705/10 |
| 2005/0261953 A1* | 11/2005 | Malek et al. | | 705/10 |
| 2006/0005121 A1* | 1/2006 | Berger et al. | | 715/513 |
| 2007/0112733 A1* | 5/2007 | Beyer et al. | | 707/3 |
| 2007/0192350 A1* | 8/2007 | Gao et al. | | 707/102 |
| 2007/0211056 A1* | 9/2007 | Chakraborty et al. | | 345/440 |
| 2007/0244741 A1* | 10/2007 | Blume et al. | | 705/10 |
| 2007/0255707 A1* | 11/2007 | Tresser et al. | | 707/6 |
| 2007/0266048 A1* | 11/2007 | Prosser et al. | | 707/104.1 |
| 2008/0046303 A1* | 2/2008 | Gordon et al. | | 705/9 |
| 2008/0059387 A1* | 3/2008 | Vaidhyanathan et al. | | 705/500 |
| 2008/0300959 A1* | 12/2008 | Sinha et al. | | 705/10 |
| 2009/0006156 A1* | 1/2009 | Hunt et al. | | 705/7 |
| 2010/0088155 A1* | 4/2010 | Pyle et al. | | 705/10 |
| 2010/0106652 A1* | 4/2010 | Sandholm et al. | | 705/80 |
| 2010/0106653 A1* | 4/2010 | Sandholm et al. | | 705/80 |
| 2011/0225116 A1* | 9/2011 | Gupta et al. | | 707/602 |
| 2012/0010916 A1* | 1/2012 | Mohanty et al. | | 705/7.11 |
| 2013/0110589 A1* | 5/2013 | McCauley | | 705/7.39 |
| 2013/0144803 A1* | 6/2013 | Chang et al. | | 705/348 |
| 2013/0253966 A1* | 9/2013 | Mohanty et al. | | 705/7.11 |

* cited by examiner

MULTIDIMENSIONAL PERSONAL BEHAVIORAL TOMOGRAPHY

BACKGROUND OF THE INVENTION

1. Field of the Invention

The invention described herein relates to marketing, and in particular relates to analysis of consumer behavior.

2. Related Art

Any seller of goods or services seeks to expand its consumer base. This can be done with any one of several marketing tactics. These tactics can include, for example, traditional advertising, or the offering of incentives to purchase. Such incentives may include rebates or discounts. Marketing tactics are most efficient when directed at a particular subset of potential customers, i.e., those consumers who are most likely to be interested in the product or service. Marketing tactics may also be directed at existing customers, in an effort to increase their spending. It is therefore prudent to identify those consumers, either existing customers or potential customers, who are most likely to want or need a particular product or service.

Figure 1:
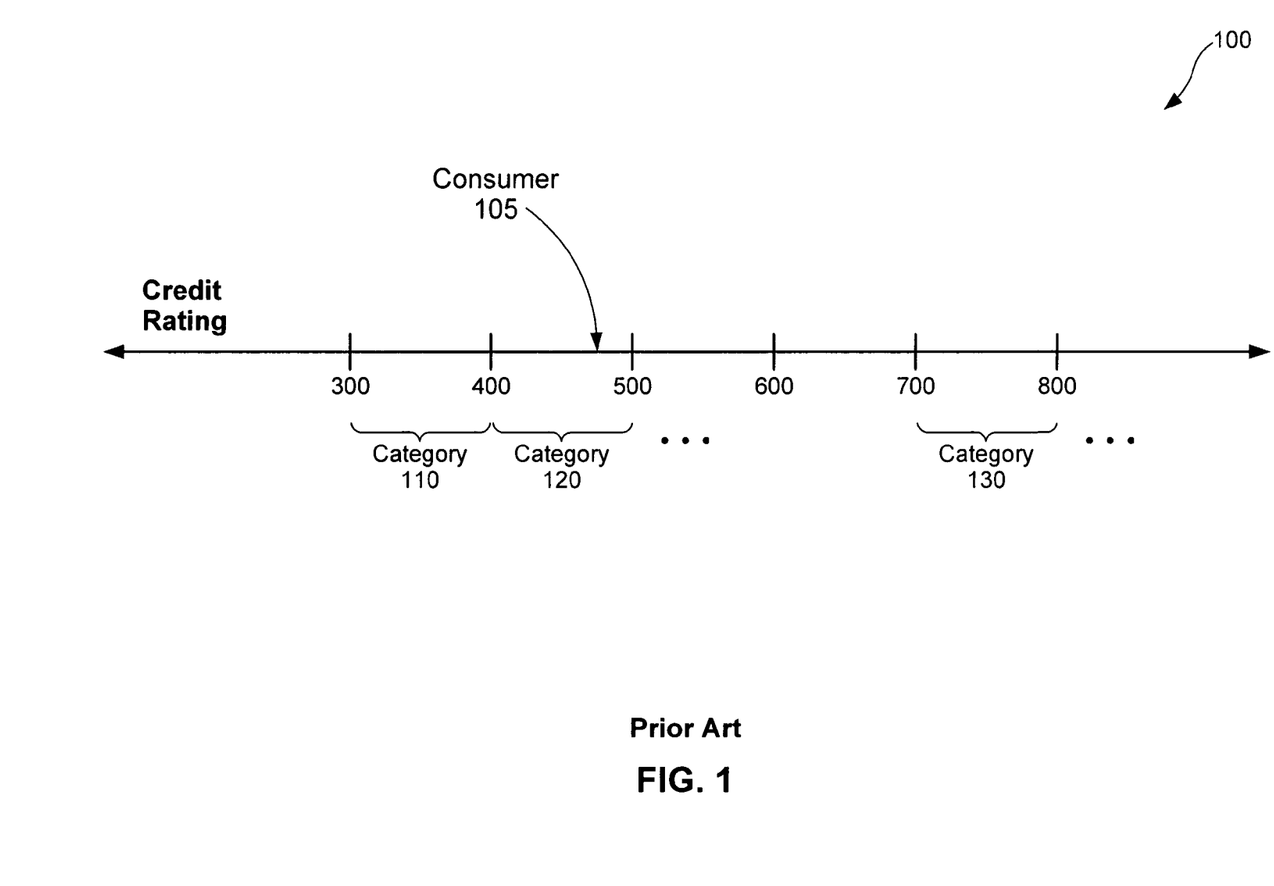
FIG. 1 illustrates how a single consumer might be plotted in a one dimensional space, i.e., where the consumer is situated with respect to a single attribute.

One method by which such consumers can be identified is collection of information about consumers, to see which ones have one or more characteristics that identify a consumer as a likely buyer. A specific characteristic can be modeled as a point on a continuum. Such a continuum 100 is shown in FIG. 1. Here, a particular credit rating, for example, can be modeled as a point on a spectrum that represents all possible credit ratings or categories thereof. A consumer 105 has a rating of 470, which is shown as the corresponding point on continuum 100. It may be convenient for analytical purposes to organize the points of such a continuum into categories. These are shown as categories 110, 120, and 130. A consumer will therefore be mapped to a particular category based on his or her credit rating. Consumer 105 belongs in category 120 of continuum 100 in the illustration.

Such a spectrum or continuum can be viewed as a dimension or attribute. Credit rating is one example of a dimension; another dimension might be income level; another might be age. If it is believed that prospective buyers have a certain characteristic, the targeted consumers will be those that are clustered around a certain point or that fall into a particular category with respect to the appropriate attribute or dimension. A bank may wish to offer a credit card for persons having a credit rating in category 120 of FIG. 1, for example. In this example, the bank would identify people having such a credit rating, and send such people mailings that describe the terms and benefits of a card offered by the bank.

In another example, an automobile manufacturer may have a model which the manufacturer wishes to market to older adults. The automobile manufacturer may identify consumers who are 55 years old, plus or minus some value, e.g., consumers between the ages of 50 and 60. Prospective customers in this demographic may then be sent advertising or rebate offers with respect to that model. Both of these examples represent single dimension analysis. In the first example, prospective customers are identified on the basis of a single attribute or dimension, i.e., credit rating. In the second example, potential borrowers are identified on the basis of a single attribute, i.e., age.

Figure 2:
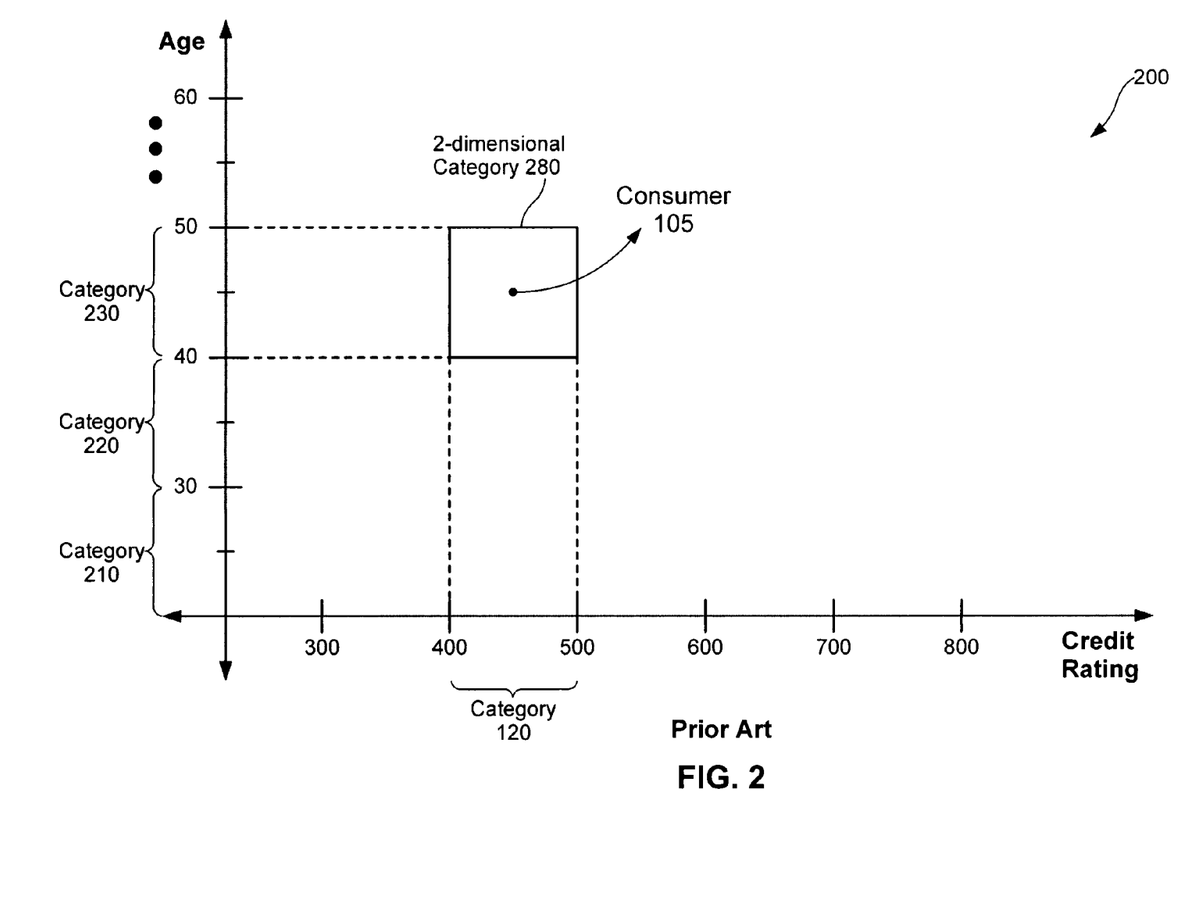
FIG. 2 illustrates how the consumer may be situated in a two dimensional space, wherein the consumer's position is plotted with respect to two different attributes.

Targeting specific consumers through analysis of a single attribute, however, has shortcomings. Generally, the set of consumers identified through such a method is too broad. For example, just because a person is between the ages of 50 and 60, does not mean that such a person has any interest in purchasing a certain automobile. Generally, only a small subset of people between the ages of 50 and 60 have any interest in purchasing an automobile. Therefore, multi-dimensional analysis is sometimes used. For example, the above automobile manufacturer may choose to market only to those people who are between the ages of 50 and 60, and who have a sufficiently high credit rating that would enable the potential customer to handle a substantial car loan. This is illustrated in FIG. 2. Here, consumer 105 has a credit rating of 470, as shown with respect to the credit rating dimension. Consumer 105 is also 45 years of age, as shown with respect to the age dimension. These two characteristics of consumer 105 are therefore modeled as a single point in a two-dimensional space. In the illustration, the age dimension is organized into categories 210, 220, and 230 in a similar manner to the categorization of the credit rating dimension. Consumer 105 therefore falls into age category 230. In the context of the illustrated two-dimensional space, consumer 105 falls into two-dimensional category 280. Category 280 represents consumers who are between the ages of 40 and 50, and who have a credit rating between 400 and 500.

Additional dimensions can also be added. The automobile manufacturer, for example, may choose to market to adults who are between the ages of 40 and 50, who have a relatively high credit rating, and who have incomes greater than $150,000 a year. Generally, additional dimensions can be included in the analysis in order to narrow the set of potential customers.

While using a large number of dimension serves to produce a narrowly focused set of consumers, performing such an analysis can be difficult. First, it may be difficult to collect enough data for potential customers. Ideally, a company may desire a variety of demographic information with respect to potential customers, along with detailed information with respect to their spending habits. All this information may difficult to obtain. In addition, analysis involving a large number of dimensions can be computationally difficult. Hundreds of attributes are available. The storage and processing of this volume of information may not be feasible or cost effective. In contrast, the use of a lower number of dimensions allows for relatively easy processing, but produces a relatively large, and unfocused set of potential consumers. This would result in the direction of marketing tactics at a set of potential customers that is too large. Many people in such a subset would have no interest in the offered product or service.

Note also that even if it were practical to handle large amounts of data thereby enabling sophisticated multi-dimensional analysis, the results may still be inadequate. This is because attributes, such as those presented above, represent snapshots of a potential customer's position. At any given point in time, a potential customer has a certain credit rating, is of a certain age, and has a certain income. Such information offers nothing with respect to trends or changes in such attributes. A person with a high income and a high credit rating may appear to be a good target for a mortgage refinancing offer. But such a person might not be as attractive a candidate if the person were about to retire and therefore experience a reduction in income. A potential customer's attributes may therefore be of interest, but trends in such attributes for the prospective customer are also of interest. Historically, such trends are not considered.

There is a need, therefore, for a method by which prospective customers can be targeted, wherein a large number of attributes can be considered in a way that allows practical and efficient data storage and processing. Moreover, such targeting also needs to include, as attributes, changes in the status of a prospective customer with respect to such attributes.

SUMMARY OF THE INVENTION

The present invention meets the above-identified need by providing a system, method and computer program product for identifying attributes of customers and potential customers, thereby allowing efficiently targeted marketing to be directed at such consumers. A body of information is first received regarding each of a number of consumers. This information can include, for example, demographic information, data regarding spending habits, and information as to how such attributes may have changed over time. Once such attributes have been determined, and any changes over time to such attributes have been determined, a correlation of the attributes is performed. This serves to reduce the overall number of attributes by consolidating those that are correlated with one another. As an example, a person who spends considerable amounts of money on recorded music and videos, may also spend considerable money on consumer electronics. In this example, those two attributes could be combined if they have a strong positive correlation. Such combined attributes are denoted herein as composite dimensions.

Given the set of composite dimensions, as well as attributes that may not have been correlated with any other attributes, individual consumers are plotted in the resulting multi-dimensional space. Sets of consumers that appear to be grouped in this multi-dimensional space are then identified. Given such a consumer group, the common attributes of this consumer group are identified. In addition, any unique attributes of a given consumer in such a consumer group are also identified. Hence, the invention identifies attributes that a consumer may have in common with a group of other consumers, and also identifies attributes that distinguish a consumer from others in a consumer group.

An advantage of the invention is that it provides a system, method, and computer program product for targeting marketing tactics to particular individuals.

An additional advantage is that it allows computationally efficient analysis of spending tendencies of groups and individuals.

Further embodiments, features, and advantages of the present invention, as well as the operation of the various embodiments of the present invention, are described below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention described herein includes a system, method and computer program product for identifying characteristics of customers and potential customers, thereby allowing efficiently targeted marketing to be directed at such consumers. A body of information is first received regarding each of a number of consumers. This information can include, for example, demographic information, data regarding spending habits, and information as to how such attributes may have changed over time. Once such attributes have been determined, and any changes over time to such attributes have been determined, a correlation of the attributes is performed. This serves to reduce the overall number of attributes by consolidating those that are correlated with one another. As an example, a person who spends considerable amounts of money on recorded music and videos, may also spend considerable money on consumer electronics. In this example, those two attributes could be combined if they have a strong positive correlation. Such combined attributes are denoted herein as composite dimensions.

Given the set of composite dimensions, as well as attributes that may not have been correlated with any other attributes, individual consumers are plotted in the resulting multi-dimensional space. Sets of consumers that appear to be grouped in this multi-dimensional space are then identified. Given such a consumer group, the common attributes of this consumer group are identified. In addition, any unique attributes of a given consumer in such a consumer group are also identified. Hence, the invention may identify attributes that a consumer may have in common with a group of other consumers, and also may identify attributes that distinguish a consumer from others in a consumer group.

The present invention is now described in more detail herein. This is for convenience only and is not intended to limit the application of the present invention. After reading the following description, it will be apparent to one skilled in the relevant arts how to implement the following invention in alternative embodiments.

The terms "user," "end user," "consumer," "customer," "participant," and/or the plural form of these terms are used interchangeably throughout herein to refer to those persons or entities capable of being affected by and/or benefiting from the present invention.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Figure 3:
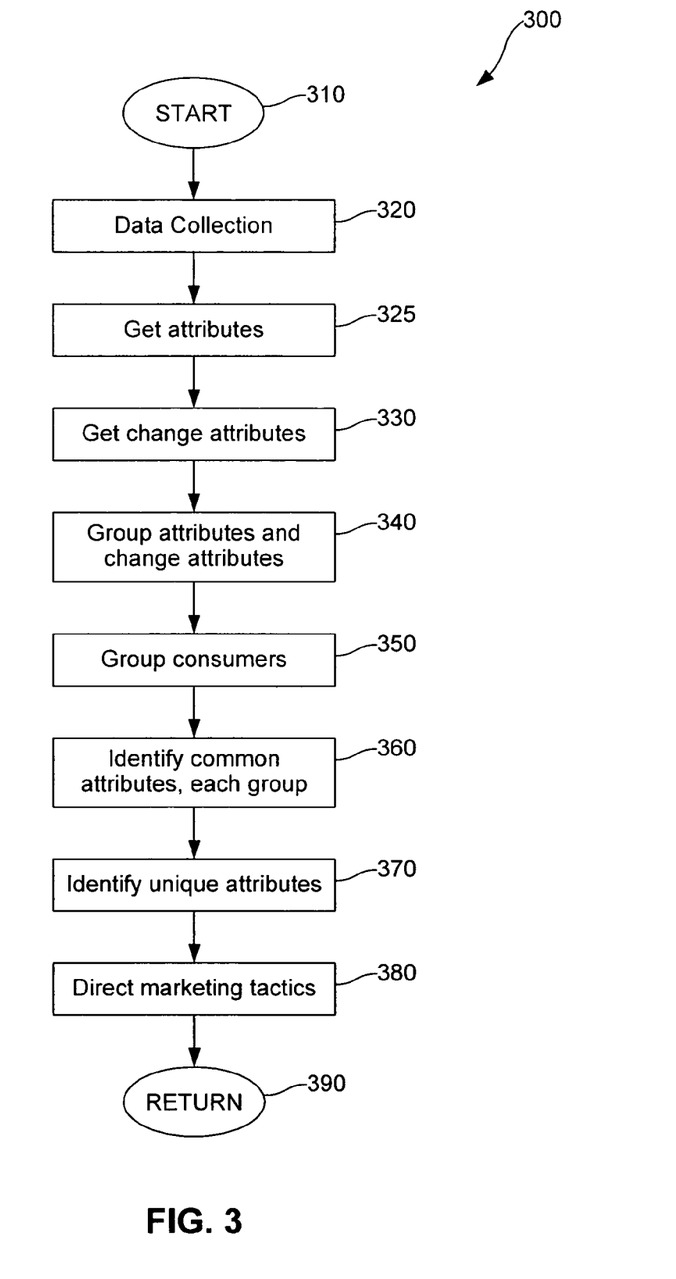
FIG. 3 is a flow chart illustrating the processing of the invention, according to an embodiment thereof.

FIG. 3 illustrates the general processing of the invention. The process begins at step 310. In step 320, data is collected with regard to customers and potential customers, collectively referred to herein as consumers. This information can include demographic data, such as age, martial status, number of children, income level, and home address. This data can also include information as to a consumer's spending habits, such as the amount of money spent on travel, the amount spent at restaurants, and the amount spent on clothing. Information as to the spending habits of a consumer is denoted herein as spend data. Spend data may be considered in aggregate with respect to a specific merchant industry, e.g., spending on air travel, and spending on consumer electronics. Spend data may also be considered in aggregate with respect to a time interval, e.g., spending on air travel in the past twelve months.

The attributes related to spending habits may also be divided more finely. The data may include, for example, the amounts spent on domestic travel versus the amount spent on overseas travel. These attributes may be further divided into other attributes such as the amounts spent on travel to Europe, or the amount spent on travel to Asia.

Overall, such data may be collected through any one of several mechanisms. Consumer surveys may be used, for example. In addition, characteristics such as spending habits may be determined on the basis of monitored credit card usage. In step 325, the data collected in step 320 is read to determine attribute information. In step 325, the attributes for each of a set of consumers is determined. Through step 325, it is determined whether a given consumer is of a certain age, marital status, etc., and whether the consumer has spent a given amount in European travel, for example. The step of getting attributes therefore represents the placing of each consumer on each of several dimensions.

Note that the attributes determined in step 325 all represent static information. This information therefore includes a consumer's current marital status, the consumer's current age, the consumer's current salary, how much money the consumer has spent eating at restaurants in the current year, etc. In step 330, the data collected in step 320 is mined for trends in these characteristics. Therefore, step 330 includes the determination of how the consumer has changed his spending habits over the last year, for example. Trends in the type and quantity of purchases made, and changes in income level, for example are noted in this step. These change attributes represent another set of dimensions, so that the extent of change in a consumer's salary is a dimension, as well as current salary itself. Likewise, the extent of change in the consumer's European travel is a dimension, as well as the current level of European travel. In step 330, these change attributes are used to place consumers on each of the corresponding dimensions.

In step 340, all dimensions, i.e., attributes and change attributes, are analyzed to determine any correlations that may exist between them. For example, significant expenditures for European travel may correlate with extensive expenditures in Italian restaurants in the U.S. A change in marital status, from single to married, may correlate with increased expenditures at stores specializing in home furnishings. Increased domestic travel to southern states may correlate with retirement. As a result of such correlation, the overall set of attributes and change attributes is effectively reduced in number. The attributes and/or change attributes that correlate with one another are combined into composite dimensions. Using the above examples, European travel and spending in Italian restaurants would be combined into a single composite dimension. Likewise, retirement and travel to southern states would be combined into another composite dimension. Moreover, there may be correlations between more than two dimensions. In general, the step of grouping attributes according to their correlations results in a reduced number of dimensions, thereby simplifying the subsequent analysis (described below).

In step 350, consumers are plotted in a multi-dimensional space, wherein the dimensions of this space include composite dimensions, plus those that remain uncombined with any others. Groups of consumers in this multi-dimensional space are then observed. There may be, for example, a cluster of consumers who are between the ages of 70 and 80, travel extensively in the U.S., and have a high credit rating. Note that such clustering may not be present with respect to all dimensions. A given group might be observed with respect to some number of dimensions, but might be distributed randomly over another dimension. This reflects the fact that a group of consumers might be alike in several ways, resulting in a grouping, but might be dissimilar in other ways.

In step 360, for each group determined in step 350, the common characteristics are determined. Despite the common characteristics of a given group, however, individuals within that group may have unique characteristics. Such attributes are determined in step 370. Therefore, steps 360 and 370 serve to identify the characteristics of an individual that are unique to that individual with respect to the group, as well as those characteristics that the consumer has in common with his group.

In step 380, marketing tactics may be directed to individuals based on the unique attributes determine in step 370, as well as the common attributes of the individual as determined in step 360. The process concludes at step 390.

Figure 4:
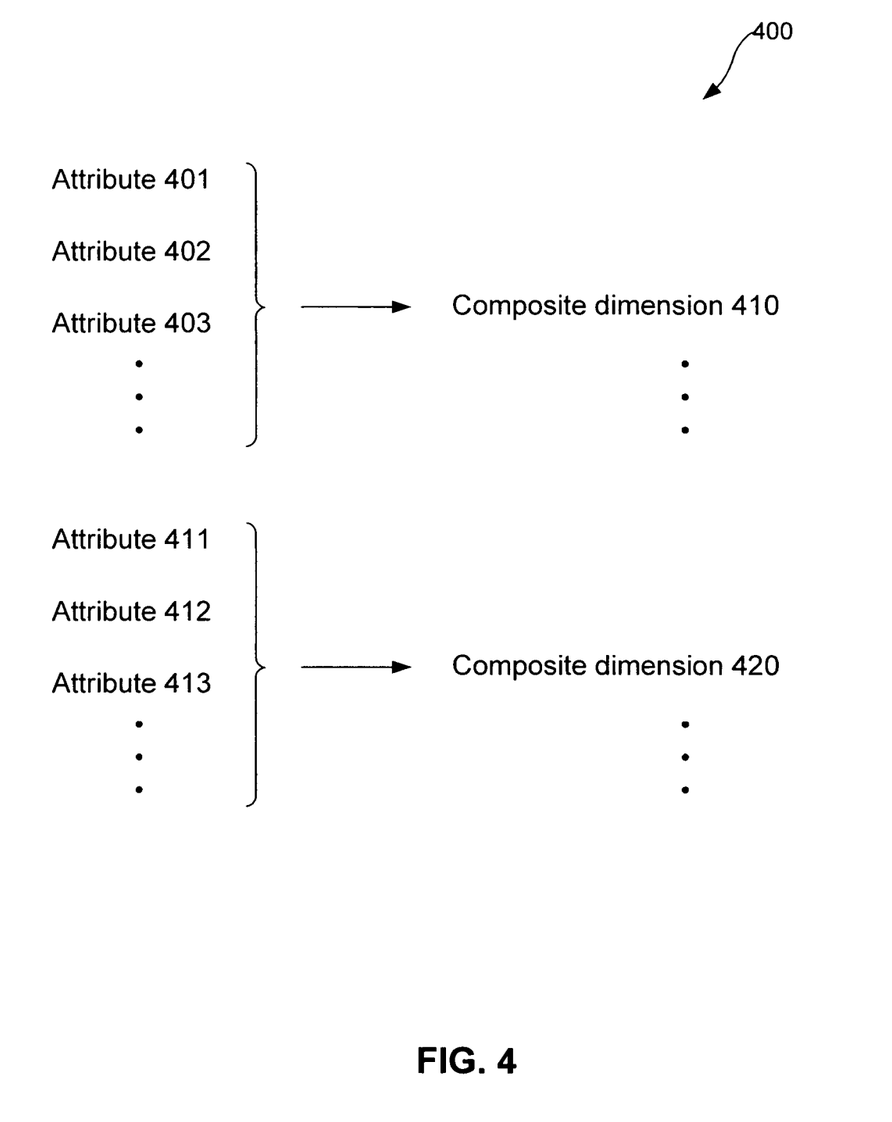
FIG. 4 illustrates the organization of attributes or dimensions into composite dimensions, according to an embodiment of the invention.
Figure 5:
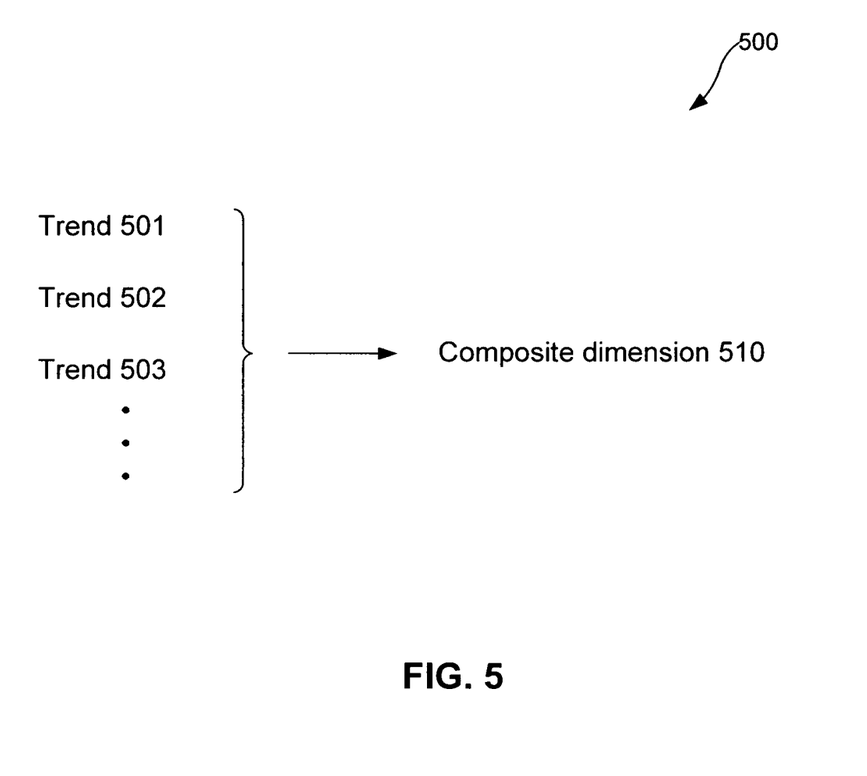
FIG. 5 illustrates how trends in consumer attributes can in themselves also be attributes which can be combined into a composite dimension.
Figure 6:
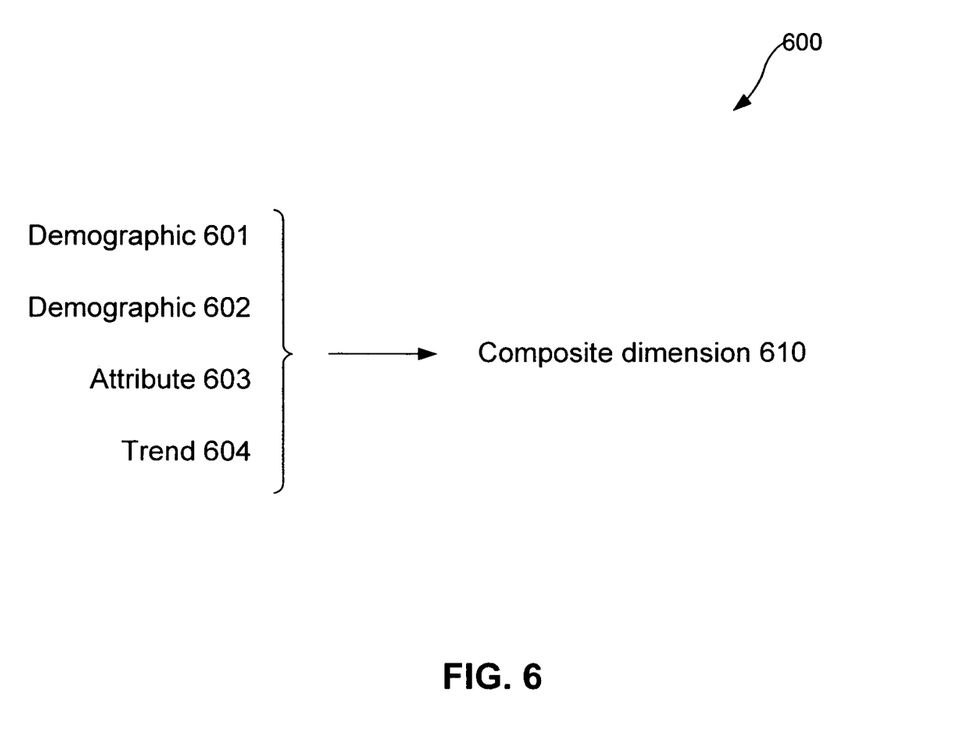
FIG. 6 illustrates how consumers' demographic attributes can be combined into a composite dimension, according to an embodiment of the invention.

The above step of grouping attributes, step 340, is illustrated in greater detail in FIGS. 4-6. In FIG. 4, attributes 401, 402, an 403 are found to be correlated with each other. These three attributes, and possibly others, are then combined to create composite dimension 410. Likewise, attributes 411, 412, and 413 are combined to create composite dimension 420. As a result of step 340, attributes 401-403 can be replaced by composite dimension 410, and attributes 411-413 can be replaced by composite dimension 420. This serves to reduce the number of attributes used in creating targeted marketing tactics. The result of step 340 is a set of composite dimensions, including composite dimensions 410 and 420. Note that not all attributes may necessarily be combined. Some attributes may be found not to correlate with any others, in which case such an attribute would remain as an uncombined dimension.

FIG. 5 illustrates how change attributes, or trends, may also be combined to form a composite dimension. In FIG. 5, trends 501, 502, and 503 are found to be correlated to one another. This correlation allows their combination into composite dimension 510.

FIG. 6 shows that demographic attributes can also be combined. Moreover, note that demographic attributes, non-demographic attributes, and change attributes can also be combined. In the example of FIG. 6, demographic attribute 601, demographic attribute 602, attribute 603, and trend 604 are all found to be correlated with one another. As a result, these attributes are combined to form a single composite dimension 610.

Figure 7:
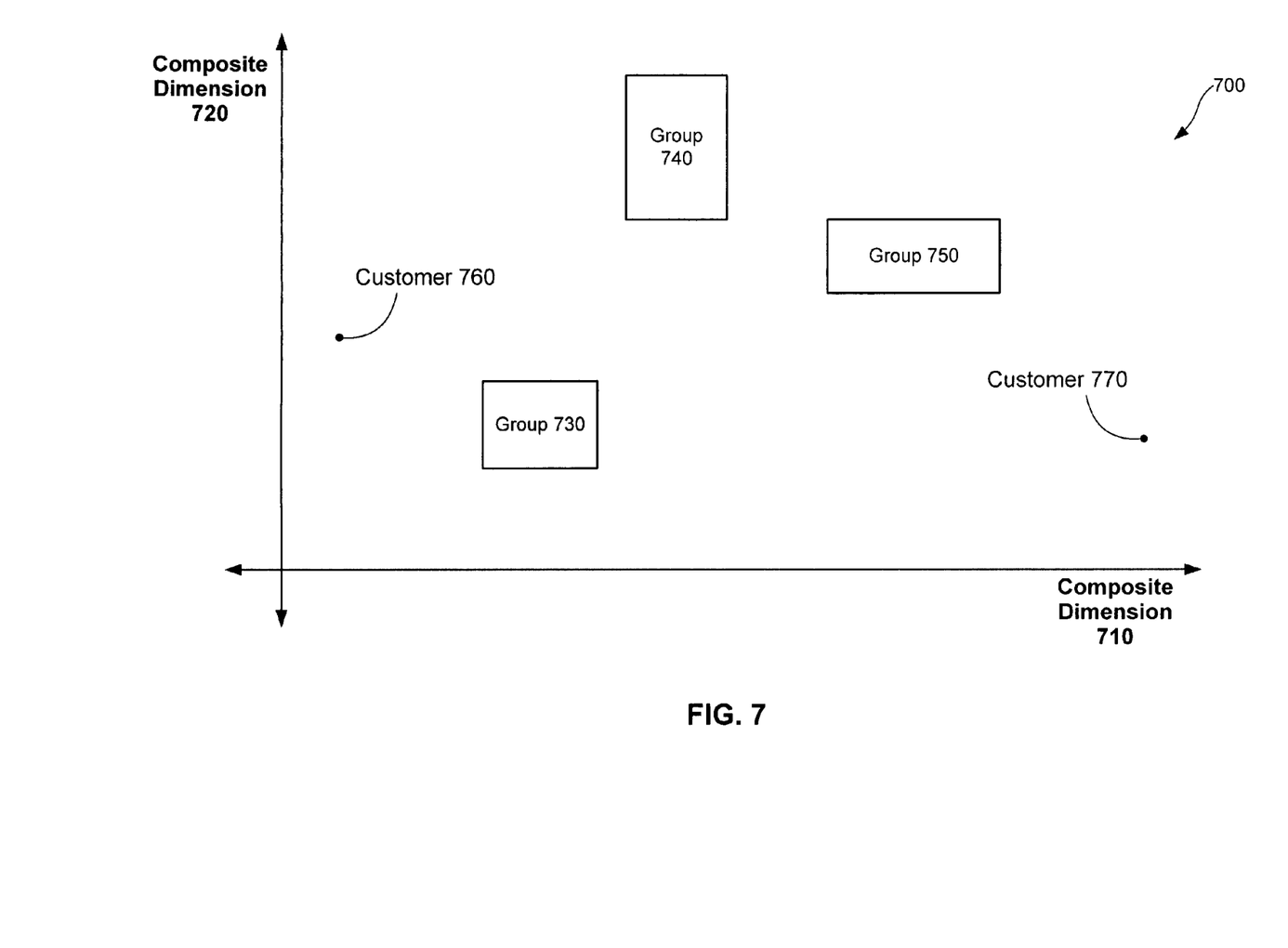
FIG. 7 illustrates how groups of consumers may be plotted in a multi-dimensional space, wherein some of the dimensions may in fact be composite dimensions, according to an embodiment of the invention.

The grouping of consumers, discussed above with respect to step 350, is illustrated in FIG. 7. Here, consumer groups as well as individual consumers are shown plotted in an n-dimensional space, where n=2. The two dimensions shown are composite dimensions 710 and 720. Three clusters of consumers are shown, groups 730, 740, and 750. Note that not every consumer will be associated with the group. Some consumers may be outliers that are not in the proximity of any particular group. Examples of such consumers include consumers 760 and 770.

Figure 8:
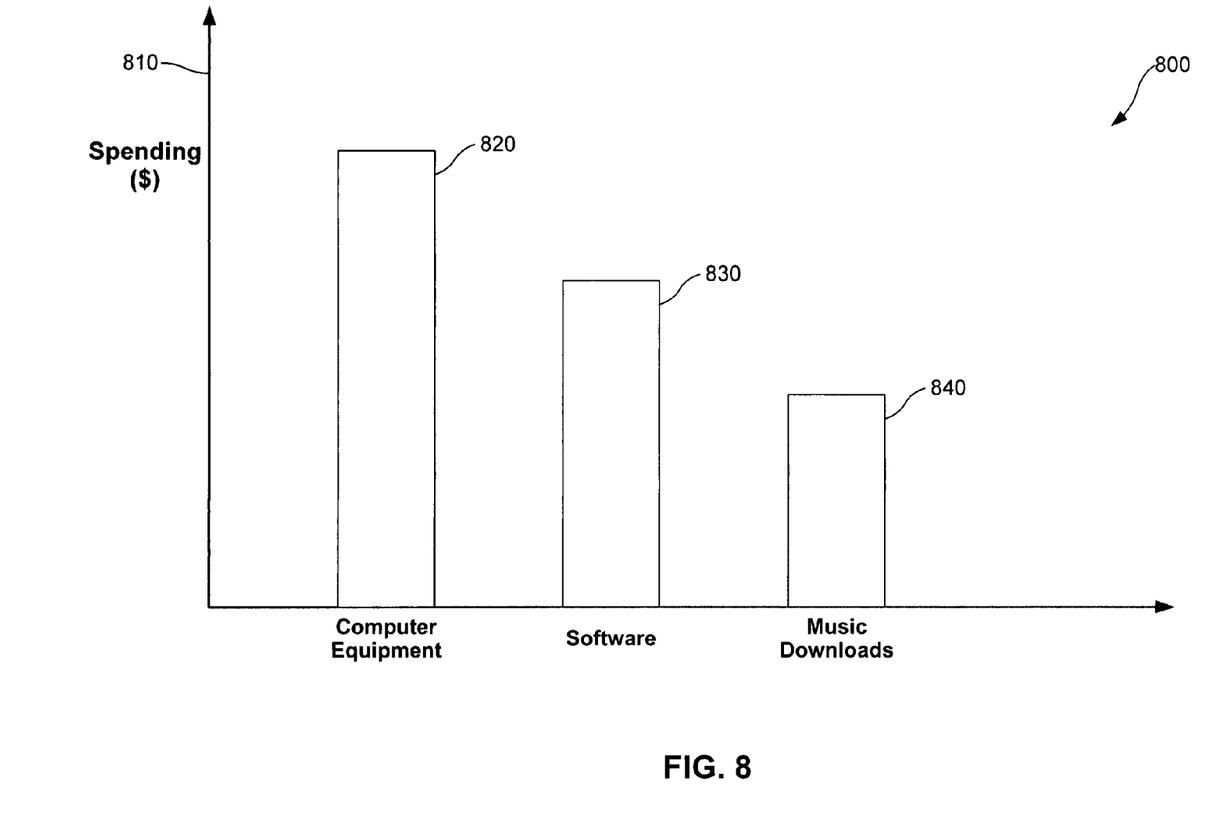
FIG. 8 illustrates how a given consumer may have attributes that distinguish it from those of a consumers group, according to an embodiment of the invention.

While a given consumer will necessarily have much in common with other members of his group, the consumer may also have characteristics that do not match other members of the group. An example of this is shown in FIG. 8. This figure shows spending 810 for three categories: computer equipment, software, and music downloads. Spending for these three categories is illustrated by quantities 820, 830, and 840 respectively. If, for example, the consumer in question is a female who is between the ages of 75 and 80 and spends very little in restaurants, this consumer would be grouped with others that fit this description. This consumer, however, may spend money on other things such as computer equipment, software, and music downloads. This would set this consumer apart from others in her group.

Such unique attributes of the consumer, as well as the attributes that she has in common with other members of her group, could then be used to direct specific marketing tactics at this consumer.

The present invention (or any part(s) or function(s) thereof) may be implemented using hardware, software or a combination thereof and may be implemented in one or more computer systems or other processing systems. However, the manipulations performed by the present invention are often referred to in terms of atomic concepts such as adding or comparing, which are commonly associated with mental operations performed by a human operator. No such capability of a human operator is necessary, or desirable in most cases, in any of the operations described herein which form part of the present invention. Rather, the operations can be machine operations. Useful machines for performing the operation of the present invention include general purpose digital computers or similar devices. Such a computer, when programmed with such logic, can be viewed as a system embodying the invention described herein. Likewise, any hardware, firmware, or software embodiment of the invention, or any combination thereof used to embody the invention, can be viewed as a system embodying the invention described herein.

Figure 9:
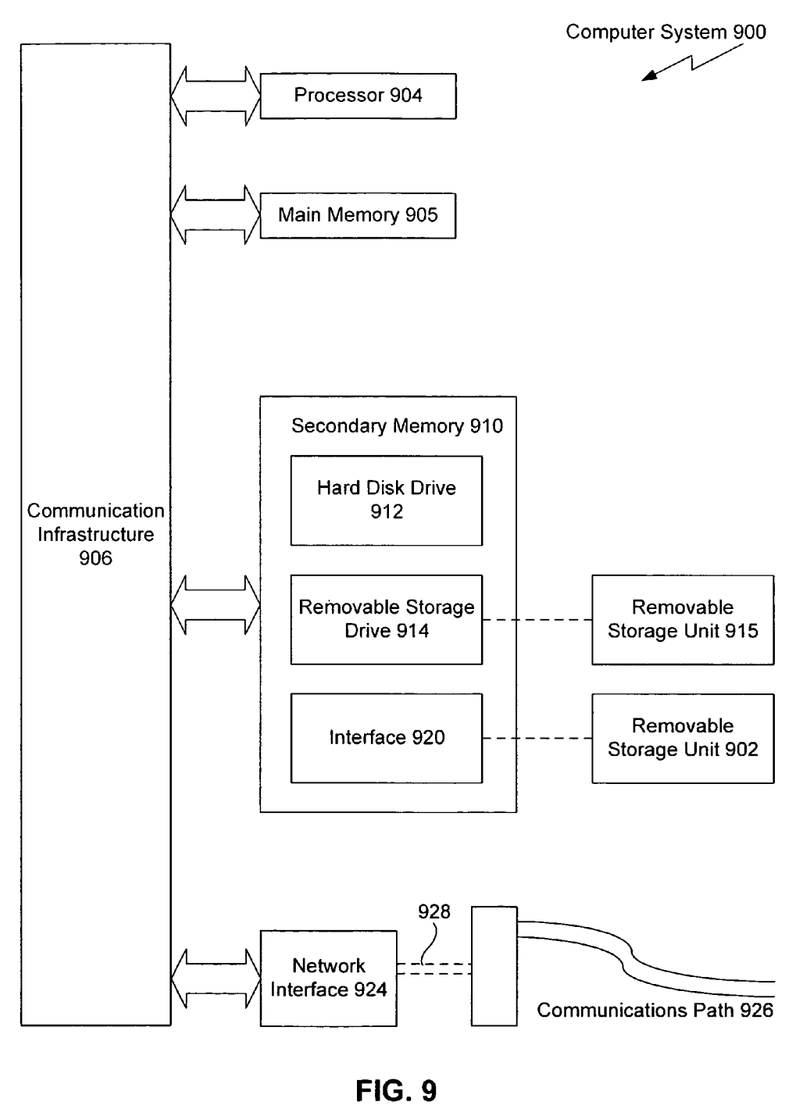
FIG. 9 illustrates a computing platform on which a software or firmware embodiment of the invention can be implemented.

The logic of the above process can be implemented as software that executes on a such a computer, such as a programmable computer 900 shown in FIG. 9. The computer 900 can be any commercially available and well known computer capable of performing the functions described herein, such as computers available from International Business Machines, Apple, Silicon Graphics Inc., Sun, HP, Dell, Compaq, Digital, Cray, etc.

The computer 900 includes one or more processors (also called central processing units, or CPUs), such as a processor 904. The processor 904 is connected to a communication bus or other communication infrastructure 906. The computer 900 also includes a main or primary memory 905, such as random access memory (RAM). The primary memory 905 has stored therein control logic (computer software), and data.

The computer 900 also includes one or more secondary storage devices 910. The secondary storage devices 910 include, for example, a hard disk drive 912 and/or a removable storage device or drive 914. The removable storage drive 914 represents a floppy disk drive, a magnetic tape drive, a compact disk drive, etc.

The removable storage drive 914 interacts with a removable storage unit 915. The removable storage unit 915 includes a computer useable or readable storage medium having stored therein computer software (control logic) and/or data. Removable storage unit 915 represents a floppy disk, magnetic tape, compact disk, DVD, optical storage disk, or any other computer data storage device. The removable storage drive 914 reads from and/or writes to the removable storage unit 915 in a well known manner.

Secondary memory 910 may also include an interface 920 through which an additional removable storage unit 902 can be attached for communication with infrastructure 906. Removable storage unit 902 can be, for example, a flash memory device or an additional hard disk unit. The interface 920 can be a universal serial bus (USB) interface or a Firewire™ interface, for example. Removable storage unit 902 can be written to or read from in a well known manner.

The computer 900 also includes input/output/display devices, such as monitors, keyboards, pointing devices, etc. (not shown)

The computer 900 further includes a communication or network interface 924. The network interface 924 enables the computer 900 to communicate with remote devices. For example, the network interface 924 allows the computer 900 to communicate over communication networks or mediums 926 (representing a form of a computer useable or readable medium), such as LANs, WANs, the Internet, etc. The network interface 924 may interface with remote sites or networks via wired or wireless connections.

Control logic may be transmitted to and from the computer 900 via the communication medium 926. More particularly, the computer 900 may receive and transmit carrier waves (electromagnetic signals) 928 modulated with the control logic via the communication medium 926.

Any apparatus or manufacture comprising a computer useable or readable medium having control logic (software) stored therein is referred to herein as a computer program product or program storage device. This includes, but is not limited to, the computer 900, the main memory 905, the hard disk 912, and the removable storage unit 915. Such computer program products, having control logic stored therein that, when executed by one or more data processing devices, cause such data processing devices to operate as described herein, represent embodiments of the invention.

Moreover, the data upon which the invention operates, i.e., the data collected in step 320 of FIG. 3, can be provided to computer 900 through network interface 924 or removable storage drive 914.

The invention can work with software, hardware, and/or operating system implementations other than those described herein. Any software, hardware, and operating system implementations suitable for performing the functions described herein can be used. The invention can, for example, be implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

In addition, it should be understood that the figures that highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   determining, by a computer based system configured for grouping consumers, consumer attributes based on received consumer data,
   wherein said received consumer data comprises demographic data of a consumer;
   determining, by said computer based system, change attributes based on said received consumer data,
   wherein said change attributes comprise trends,
   wherein said change attributes comprise extent of change and rates of change of said consumer attributes;
   organizing said consumer attributes and said change attributes, by said computer based system, according to correlations of said consumer attributes and change attributes, to create a set of composite dimensions,
   wherein said composite dimensions are established based on a positive correlation between said consumer attributes and said change attributes;
   plotting, by said computer based system, consumers relative to said set of composite dimensions on a multi-dimensional space;
   grouping consumers, by said computer based system, according to location within said multidimensional space to create a consumer group;
   identifying, by said computer based system, common attributes of said consumer group; and
   identifying, by said computer based system, unique attributes of said consumer in said consumer group.

2. The method of claim 1, further comprising:
   directing, by said computer based system, marketing tactics at said consumer on a basis of one or more common attributes of said consumer group associated with said consumer.

3. The method of claim 1, further comprising:
   directing, by said computer based system, marketing tactics at said consumer on additional basis of one or more unique attributes of said consumer.

4. The method of claim 3, wherein said marketing tactics comprise targeted spending incentives.

5. The method of claim 3, wherein said marketing tactics comprise targeted advertising.

6. The method of claim 1, wherein said received consumer data comprises spend data of said consumer.

7. The method claim 6, wherein said spend data is aggregated by time interval.

8. The method of claim 6, wherein said spend data is aggregated by merchant industry.

9. The method of claim 1, wherein the received consumer data is from a consumer survey.

10. A non-transitory computer-readable storage medium having stored thereon a plurality of instructions, when executed by a processor configured for grouping consumers, are configured to cause said processor to perform operations comprising:
    determining, by said processor, consumer attributes based on received consumer data,
    wherein said received consumer data comprises demographic data of a consumer;
    determining, by said processor, change attributes based on said received consumer data,
    wherein said change attributes comprise trends,
    wherein said change attributes comprise extent of change and rates of change of said consumer attributes;
    organizing said consumer attributes and said change attributes, by said processor, according to correlations of said consumer attributes and change attributes, to create a set of composite dimensions,
    wherein said composite dimensions are established based on a positive correlation between said consumer attributes and said change attributes;
    plotting, by said processor, consumers relative to said set of composite dimensions on a multi-dimensional space;
    grouping consumers, by said processor, according to location within said multidimensional space to create a consumer group;
    identifying, by said processor, common attributes of said consumer group; and
    identifying, by said processor, unique attributes of said consumer in said consumer group.

11. The medium of claim 10, wherein said received consumer data comprises spend data of said consumer.

12. The medium of claim 11, wherein said spend data is aggregated by time interval.

13. The medium of claim 11, wherein said spend data is aggregated by merchant industry.

14. A computer based system, comprising:
    a computer network communicating with a memory;
    said memory communicating with a processor configured for grouping consumers; and
    said processor, when executing a computer program is configured to: determine, by said processor, consumer attributes based on received consumer data,
    wherein said received consumer data comprises demographic data of a consumer;
    determine, by said processor, change attributes based on said received consumer data,
    wherein said change attributes comprise trends,
    wherein said change attributes comprise extent of change and rates of change of said consumer attributes;

organize said consumer attributes and said change attributes, by said processor, according to correlations of said consumer attributes and change attributes, to create a set of composite dimensions, wherein said composite dimensions are established based on a positive correlation between said consumer attributes and said change attributes;

plot, by said processor, consumers relative to said set of composite dimensions on a multi-dimensional space;

group consumers, by said processor, according to location within said multidimensional space to create a consumer group;

identify, by said processor, common attributes of said consumer group; and identify, by said processor, unique attributes of said consumer in said consumer group.

15. The computer based system of claim 14, wherein said received consumer data comprises spend data of said consumer.

* * * * *